United States Patent
Bolduc

(10) Patent No.: US 12,187,366 B2
(45) Date of Patent: Jan. 7, 2025

(54) REVERSING TRAILER PATH FOLLOWING

(71) Applicant: Continental Autonomous Mobility US, LLC, Auburn Hlls, MI (US)

(72) Inventor: Andrew Phillip Bolduc, Rochester Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 180 days.

(21) Appl. No.: 17/656,485

(22) Filed: Mar. 25, 2022

(65) Prior Publication Data
US 2023/0303161 A1  Sep. 28, 2023

(51) Int. Cl.
*B62D 6/00* (2006.01)
*B60W 30/18* (2012.01)
*B60W 60/00* (2020.01)
*B62D 15/02* (2006.01)

(52) U.S. Cl.
CPC ....... *B62D 6/002* (2013.01); *B60W 30/18036* (2013.01); *B60W 60/001* (2020.02); *B62D 15/025* (2013.01); *B60W 2510/20* (2013.01); *B60W 2520/06* (2013.01); *B60W 2530/201* (2020.02); *B60W 2530/203* (2020.02); *B60W 2710/207* (2013.01)

(58) Field of Classification Search
None
See application file for complete search history.

(56) References Cited

U.S. PATENT DOCUMENTS

| | | |
|---|---|---|
| 7,154,385 B2 | 12/2006 | Lee et al. |
| 8,548,683 B2 | 10/2013 | Cebon et al. |
| 9,164,955 B2 | 10/2015 | Lavoie |
| 9,493,187 B2 | 11/2016 | Pilutti |
| 9,540,043 B2 | 1/2017 | Lavoie |
| 9,555,832 B2 | 1/2017 | Smit et al. |

(Continued)

FOREIGN PATENT DOCUMENTS

| | | |
|---|---|---|
| CN | 113696970 A | 11/2021 |
| FR | 2515379 A1 | 4/1983 |

OTHER PUBLICATIONS

M. Abroshan, et al., "Automatic steering control in tractor semi-trailer vehicles for low-speed maneuverability enhancement", Institution of Mechanical Engineers; Journal of Multi-Body Dynamics, Jun. 18, 2016, DOI: 10.1177/1464419316651375.

(Continued)

*Primary Examiner* — Aniss Chad
*Assistant Examiner* — Christopher George Fees

(57) ABSTRACT

A method of reversing a trailer along a defined path according to a disclosed exemplary embodiment includes, among other possible things, detecting a deviation from a predefined path of a trailer coupled to a tow vehicle with a sensor system disposed within the tow vehicle, determining a correction path required to move the trailer back to the predefined path, determining a dampening factor for limiting deviation from the predefined path, combining the determined correction path and the dampening factor to determine a desired curvature, wherein the desired curvature represents a path from a current position of the trailer to the predefined path, and determining a steering angle of the tow vehicle that provides the desired curvature.

19 Claims, 4 Drawing Sheets

(56) References Cited

U.S. PATENT DOCUMENTS

| | | | |
|---|---|---|---|
| 10,086,870 B2* | 10/2018 | Gieseke | B60W 30/09 |
| 10,604,184 B2 | 3/2020 | Mattern | |
| 2005/0206225 A1 | 9/2005 | Offerle et al. | |
| 2006/0103511 A1 | 5/2006 | Lee | |
| 2007/0152424 A1 | 7/2007 | Deng et al. | |
| 2015/0158527 A1 | 6/2015 | Hafner et al. | |
| 2015/0210317 A1* | 7/2015 | Hafner | B62D 13/06 |
| | | | 701/41 |
| 2016/0114831 A1* | 4/2016 | Laine | G08G 1/168 |
| | | | 701/41 |
| 2019/0275941 A1* | 9/2019 | Lu | B60R 1/26 |
| 2020/0001920 A1* | 1/2020 | Hejase | B60W 30/18036 |
| 2020/0180691 A1* | 6/2020 | Sandblom | B60W 30/18036 |
| 2020/0247471 A1* | 8/2020 | Grodde | B60W 50/045 |
| 2021/0107561 A1 | 4/2021 | Gieseke | |
| 2023/0202505 A1* | 6/2023 | Davani | B60W 30/18036 |
| | | | 340/438 |

OTHER PUBLICATIONS

Sina Milani, et al., "Semitrailer Steering Control for Improved Articulated Vehicle Manoeuverability and Stability", Nonlinear Engineering 2019, Apr. 2019; 8: 568-581.

The International Search Report and the Written Opinion of the International Searching Authority mailed on Jul. 13, 2023 for the counterpart PCT Application No. PCT/US2023/064960.

Olof Enqvist, "AFS-Assisted Trailer Reversing," Master's Thesis in Automatic Control, Department of Electrical Engineering, Linkopings University, Sweden, Jan. 2006.

* cited by examiner ial Field

REVERSING TRAILER PATH FOLLOWING

TECHNICAL FIELD

The present disclosure relates to method and system for controlling a trailer along a reversing path.

BACKGROUND

Autonomously operated or assisted vehicles may aid a vehicle operator and/or take over control of the vehicle. Autonomous and semi-autonomous operation is of use for vehicle maneuvers that are most challenging to a vehicle operator. For example, parallel parking and reversing of a vehicle with a trailer. Reversing of a vehicle trailer is a maneuver that most drivers do not perform often and therefore autonomous or semi-autonomous assist systems are of great value to vehicle consumers. Automotive system and parts manufactures continually seek to improve vehicle operation, efficiencies and customer satisfaction.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of reversing a trailer along a defined path according to a disclosed exemplary embodiment includes, among other possible things, detecting a deviation from a predefined path of a trailer coupled to a tow vehicle with a sensor system disposed within the tow vehicle, determining a correction path required to move the trailer back to the predefined path, determining a dampening factor for limiting deviation from the predefined path, combining the determined correction path and the dampening factor to determine a desired curvature, wherein the desired curvature represents a path from a current position of the trailer to the predefined path, and determining a steering angle of the tow vehicle that provides the desired curvature.

In another exemplary embodiment of the foregoing method, detecting the deviation from the predefined path includes determining a lateral deviation between a current trailer position and the predefined path.

In another exemplary embodiment of any of the foregoing methods, the lateral deviation is a distance between a longitudinal axis of the trailer and the predefined path that is normal to the predefined path.

In another exemplary embodiment of any of the foregoing methods, detecting the deviation from the predefined path further includes determining a heading deviation between the current trailer position and the predefined path.

In another exemplary embodiment of any of the foregoing methods, the heading deviation comprises an angle defined between a longitudinal axis of the trailer and the predefined path.

In another exemplary embodiment of any of the foregoing methods, the lateral deviation and the heading deviation are determined relative to at least one of a plurality of waypoint disposed along the predefined path.

Another exemplary embodiment of any of the foregoing methods further comprises adjusting the steering angle of the tow vehicle according to the determined steering angle.

In another exemplary embodiment of any of the foregoing methods, the steering angle is determined based on a length of the wheel base and a length from a hitch to an axle of the tow vehicle.

In another exemplary embodiment of any of the foregoing methods, the vehicle includes a controller with computer executable instructions configured to perform the steps for determining the desired curvature.

Another exemplary embodiment of any of the foregoing methods further comprises determining a pose of the trailer in a local reference frame with sensors disposed in the tow vehicle.

An autonomous vehicle control system according to another exemplary embodiment includes, among other possible things, a controller with computer executable instructions configured to determine, when executed by at least one processor, a steering angle of a tow vehicle required to maneuver an attached trailer along a predefined path, wherein the determination includes detecting a deviation from a predefined path of a trailer coupled to a tow vehicle with a sensor system disposed within the tow vehicle, determining a correction path required to move the trailer back to the predefined path, determining a dampening factor for limiting deviation from the predefined path, combining the determined correction path and the dampening factor to determine a desired curvature, wherein the desired curvature represents a path from a current position of the trailer to the predefined path, and determining the steering angle of the tow vehicle that provides the desired curvature.

In another embodiment of the foregoing autonomous vehicle control system, detecting the deviation from the predefined path further comprises determining a lateral deviation between a current trailer position and the predefined path.

In another embodiment of any of the foregoing autonomous vehicle control systems, detecting the deviation from the predefined path further comprises determining a heading deviation between the current trailer position and the predefined path.

In another embodiment of any of the foregoing autonomous vehicle control systems, the controller is further configured to determine the lateral deviation and the heading deviation are determined relative to at least one of a plurality of waypoint disposed along the predefined path.

In another embodiment of any of the foregoing autonomous vehicle control systems, the controller is further configured to determine the steering angle based on a length of a wheelbase and a length from a hitch to an axle of the tow vehicle.

In another embodiment of any of the foregoing autonomous vehicle control systems, the controller further configured to determining a pose of the trailer in a local reference frame with sensors disposed in the tow vehicle.

In another embodiment of any of the foregoing autonomous vehicle control systems, the controller includes a memory device in communication with the processor, the memory device including the computer executable instructions.

A computer readable medium comprising instructions executable by a controller configured to determine, when executed by at least one processor, a steering angle of a tow vehicle required to maneuver an attached trailer along a predefined path, wherein the determination according to another exemplary embodiment includes, among other possible things, detecting a deviation from a predefined path of a trailer coupled to a tow vehicle with a sensor system disposed within the tow vehicle, determining a correction path required to move the trailer back to the predefined path, determining a dampening factor for limiting deviation from the predefined path, combining the determined correction path and the dampening factor to determine a desired curvature, wherein the desired curvature represents a path from a current position of the trailer to the predefined path, and determining the steering angle of the tow vehicle that provides the desired curvature.

In another embodiment of the foregoing computer readable medium, the instructions for determining a deviation from a predefined path of the trailer further include instructions for determining a lateral deviation between a current trailer position and the predefined path and a heading deviation between the current trailer position and the predefined path.

Another exemplary embodiment of any of the foregoing computer readable mediums further comprises instructions for prompting operation of a steering system to adjust the steering angle to the determined steering angle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
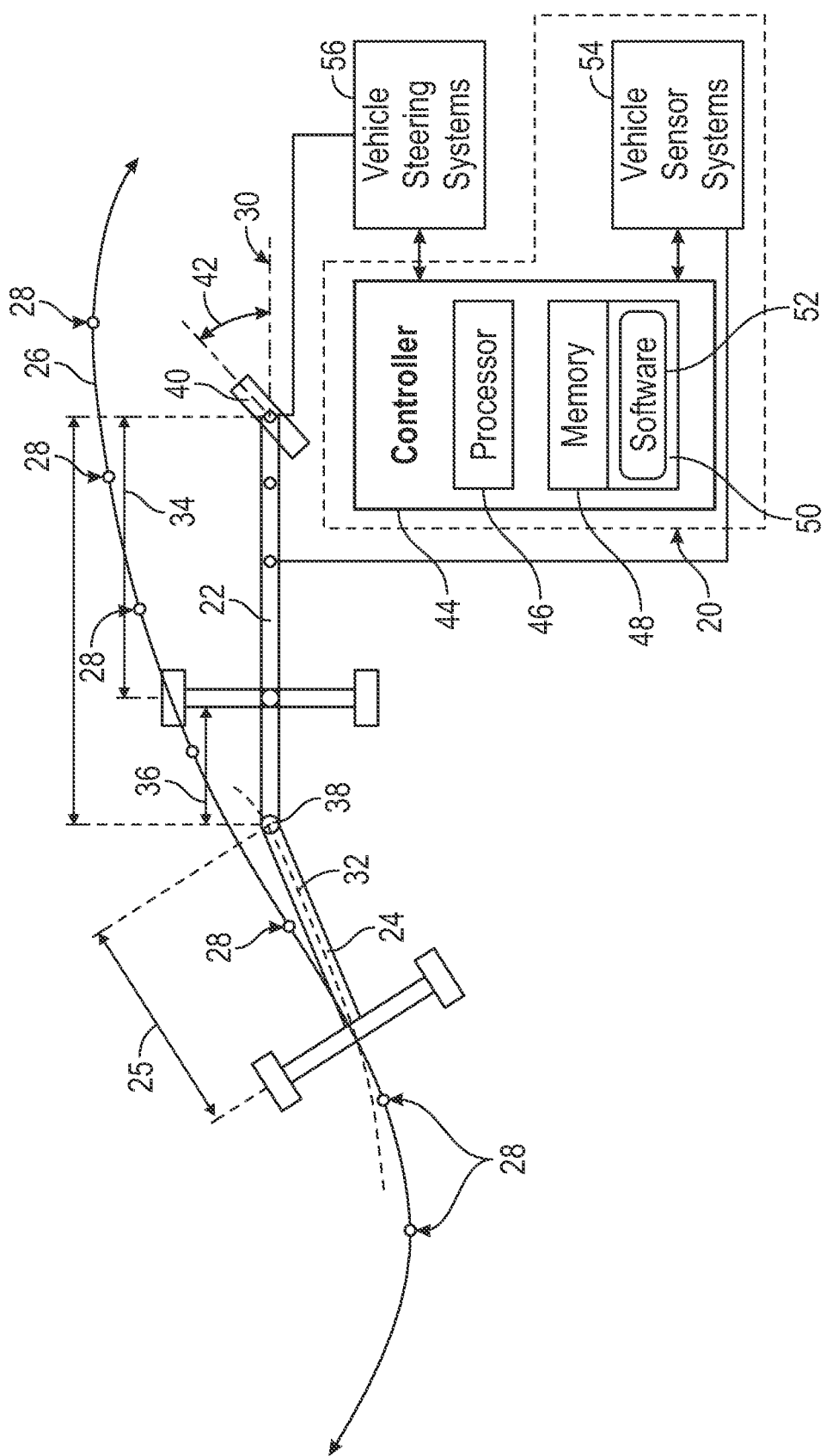
FIG. 1 is a schematic illustration of a tow vehicle and trailer proceeding along a predefined reversing path.

Referring to FIG. 1, a control system 20 is schematically shown and includes features for determining a corrective steering response by a tow vehicle 22 to move a trailer 24 back to a predefined reversing path 26.

The example tow vehicle 22 is attached to the trailer 24 at a pivoting coupling 38. A steering wheel 40 of the tow vehicle 22 is positioned at an angle 42 that adjusts a heading of the trailer 24. The tow vehicle 22 is disposed along a longitudinal axis 30 and includes a wheelbase length 34 and a length 36 between an axle and the coupling 38. The trailer 24 is disposed along a longitudinal axis 32 and includes a wheelbase 25.

During reversing operations of the tow vehicle 22, the trailer 24 may deviate from a predefined path 26. In this example, the predefined path 26 is formed along a plurality of waypoints 28. Deviation from the predefined path 26 by the trailer 24 requires a corrective action provided by adjustment of the angle 42 of the steering wheel 40. Oscillation of the trailer 24 back and forth across the path caused by over-correction and/or under-correction of the steering angle 42 is a condition to be avoided during operation.

The example control system 20 determines a corrective path to move the trailer 24 back to the predefined path 26 with little to no oscillation. In this disclosed embodiment, the control system 20 is embodied in software instructions 52 stored within a memory device 48 of a controller 44. The controller 44 includes a processor 46 that operates according to the software instructions 52 stored within the memory device 48. The memory device 48 may include a computer readable medium schematically indicated at 50.

The computer readable medium 50 may be embodied in structures such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. The disclosed computer readable medium may be a non-transitory medium such as those examples provided.

Moreover, the software instructions 52 may be saved in the memory device 48. The disclosed memory device 50, may can include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). The software instructions 52 in the memory device 48 may include one or more separate programs, each of which includes an ordered listing of executable instructions for implementing logical functions. The disclosed controller 44 is configured to execute the software instructions 52 stored within the memory device 48, to communicate data to and from the memory device 48, and to generally control operations pursuant to the software. Software in memory, in whole or in part, is read by the processor 46, perhaps buffered within the processor, and then executed.

The vehicle 22 includes a steering system 56 that receives input from the controller 44 to determine a specific angle 42 required to maneuver the trailer 24 along the path 26. The example vehicle 22 further includes a plurality of vehicle sensor systems schematically indicated at 54 that enable determination of the vehicle location and other vehicle odometry required and utilized to determine the desired corrective path.

Figure 2:
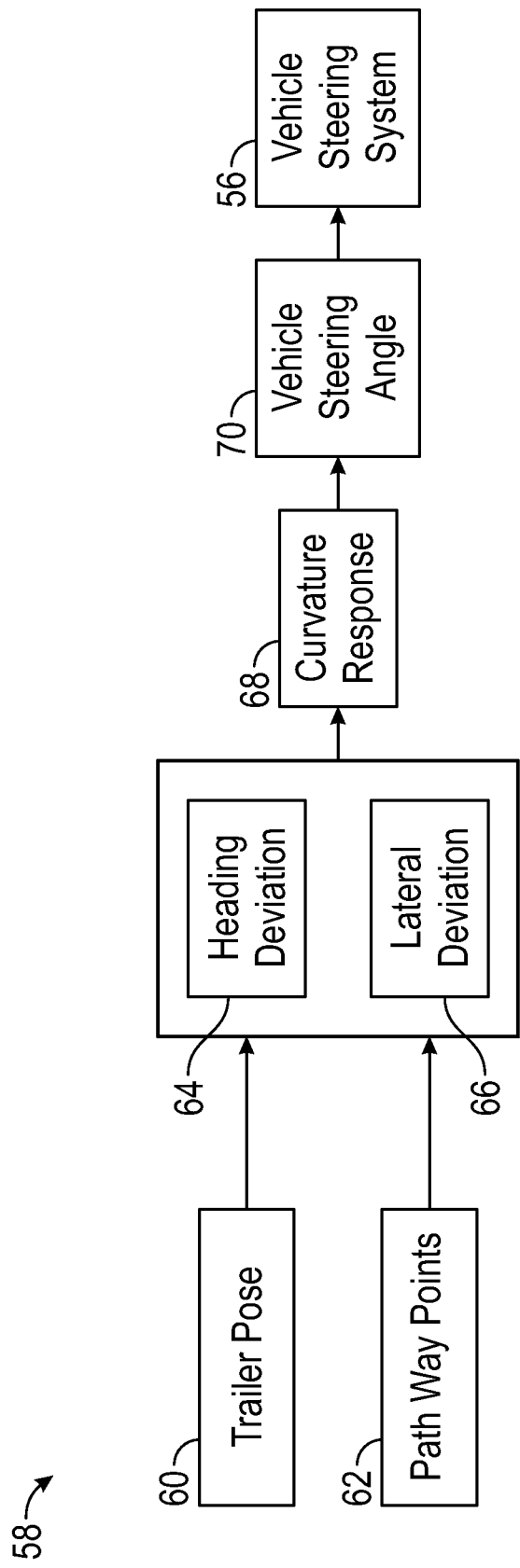
FIG. 2 is a flow chart of an example vehicle control system embodiment for determining a curvature response.

Referring to FIG. 2, with continued reference to FIG. 1, a flow diagram 58 is shown that illustrates the process performed by the disclosed control system 20. The control system 20 obtains information regarding a trailer pose as is schematically indicated at 60 along with information regarding path 26 way points 28 as is schematically indicated at 62. The trailer pose 60 is determined by a plurality of information that indicate a direction and heading of the trailer 24. The path way points 28 are input to provide for the determination of a deviation from the predefined path 26.

Deviation from the defined path 26, in one example embodiment, includes a determination of a heading deviation a heading and a lateral deviation as is shown schematically at 64 and 66 respectively. The heading deviation 64 comprises an angle of the longitudinal axis 32 of the trailer 24 relative to the path 26. The lateral deviation is a linear between the longitudinal axis 32 of the trailer 24 and the path 26. The deviations 64, 66 are fed to a curvature response module 68. The curvature response module 68 determines a corrective path curvature needed to efficiently move the trailer 24 back to the path 26. The curvature response module 68 combines differential geometry and spring mass damper analysis to generate the curvature needed to move the trailer back to the path without substantial oscillation.

Figure 3:
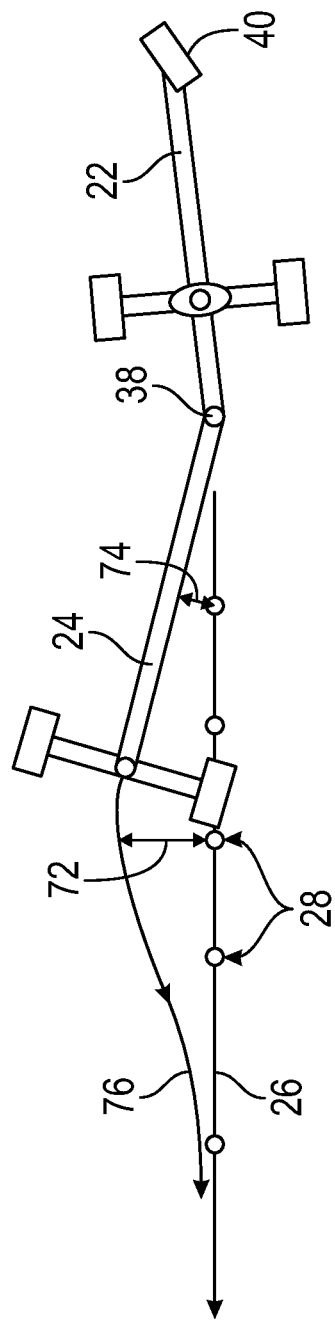
FIG. 3 is a schematic illustration of a trailer that has deviated from a straight line reversing path.

Referring to FIG. 3, with continued reference to FIG. 2, a heading deviation 72 and a lateral deviation 74 of the example trailer 24 relative to a straight ling path 26 is schematically shown. The lateral deviation 74 is the angle between the trailer longitudinal axis 32 and the path 26. The heading deviation 74 is the distance between the axis 32 and the path 26 normal to the path 26. The curvature response module 68 receives heading deviation 64 and lateral deviation 66 corresponding to those indicated in FIG. 3 and utilize that information to determine a curvature of a correction path indicated at 76 that is needed to move the trailer 24 back along the path 26.

In one disclosed example embodiment, the curvature response module 68 performs an analysis represented by an equation that combines spring mass damper calculations with and differential geometry calculations to determine the curvature of the corrective path 76. In one disclosed example the analysis performed by the curvature response module 68 is represented by Equation 1 shown below.

$$R_c = \frac{\left(\sqrt{1+\tan^2\Phi}\right)^3}{C\tan\Phi - Ky}. \qquad \text{Equation 1}$$

In Equation 1:

c is the damping coefficient;

K is the spring constant;

$c = 2\sqrt{K}$ (critically damped);

$R_c$ is the desired radius of curvature;

y'=tan $\Phi$; and m=1 because the trailer can move only along its longitudinal axis.

Equation 1 provides an output for the desired curvature of the corrective path indicated at 76. The curvature response provided by Equation 1 is utilized when the desired path 26 is a straight line path.

Figure 4:
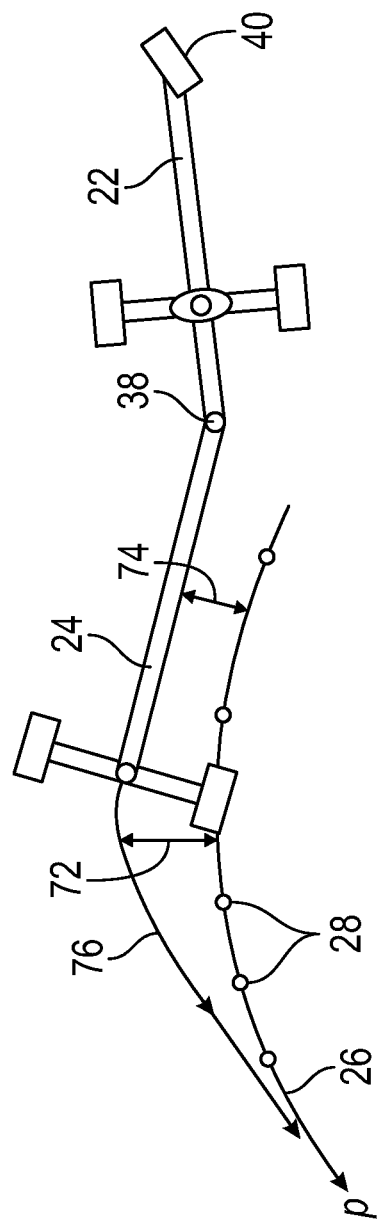
FIG. 4 is a schematic diagram of the trailer that has deviated from a curved reversing path.

Referring to FIG. 4 with continued reference to FIG. 2, if the desired path 26 includes a curve as is illustrated in FIG. 4, a different equation is utilized that factors in the curvature of the predefined path 26. In one disclosed embodiment, the curvature of the corrective path is determined using an analysis represented by Equation 2.

$$R_c = \frac{\left(\sqrt{1+\tan^2\Phi}\right)^3}{C\tan\Phi - Ky + \frac{\tan(\theta_k - \theta_{k-1})}{dist_{k-1 \to k}}}. \qquad \text{Equation 2}$$

In Equation 2, $\theta_k - \theta_{k-1}$ is the heading difference; and $dist_{k-1 \to k}$ is the displacement from the previous waypoint.

The other variables are the same as described with regard to Equation 1.

Once the curvature response 68 has been determined by the vehicle control system 20, a vehicle steering angle 42 is determined by vehicle steering angle module 70. The steering angle module 70 determines angle 42 required by the tow vehicle front wheel 40 needed to achieve the curvature defined in the curvature response module 68 according to analysis completed according to either of Equations 1 or 2. In one disclosed example, the vehicle steering angle is determined by an analysis represented by Equation 3.

$$\delta = \tan^{-1}\frac{\left(\cos(\gamma) + \frac{\sin(\gamma)R_c}{L_T}\right)L_{WB}}{\left(\sin(\gamma) - \frac{\cos(\gamma)R_c}{L_T}\right)L_H}. \qquad \text{Equation 3}$$

In Equation 3, $\delta$ is the vehicle steered wheel angle (bounded between the maximum turning angle, $\pm\delta_{max}$);

$\gamma$ is the hitch angle;

$L_T$ is the trailer wheelbase;

$L_{WB}$ is the vehicle wheelbase; and $L_H$ is the length of the hitch (from vehicle axle to hitch point).

The example Equation 3 provides the angle 42 required by the front wheel 40 that provides a change in direction and heading of the trailer 24 to move along the corrective path 76 back along the desired path 26.

Figure 5:
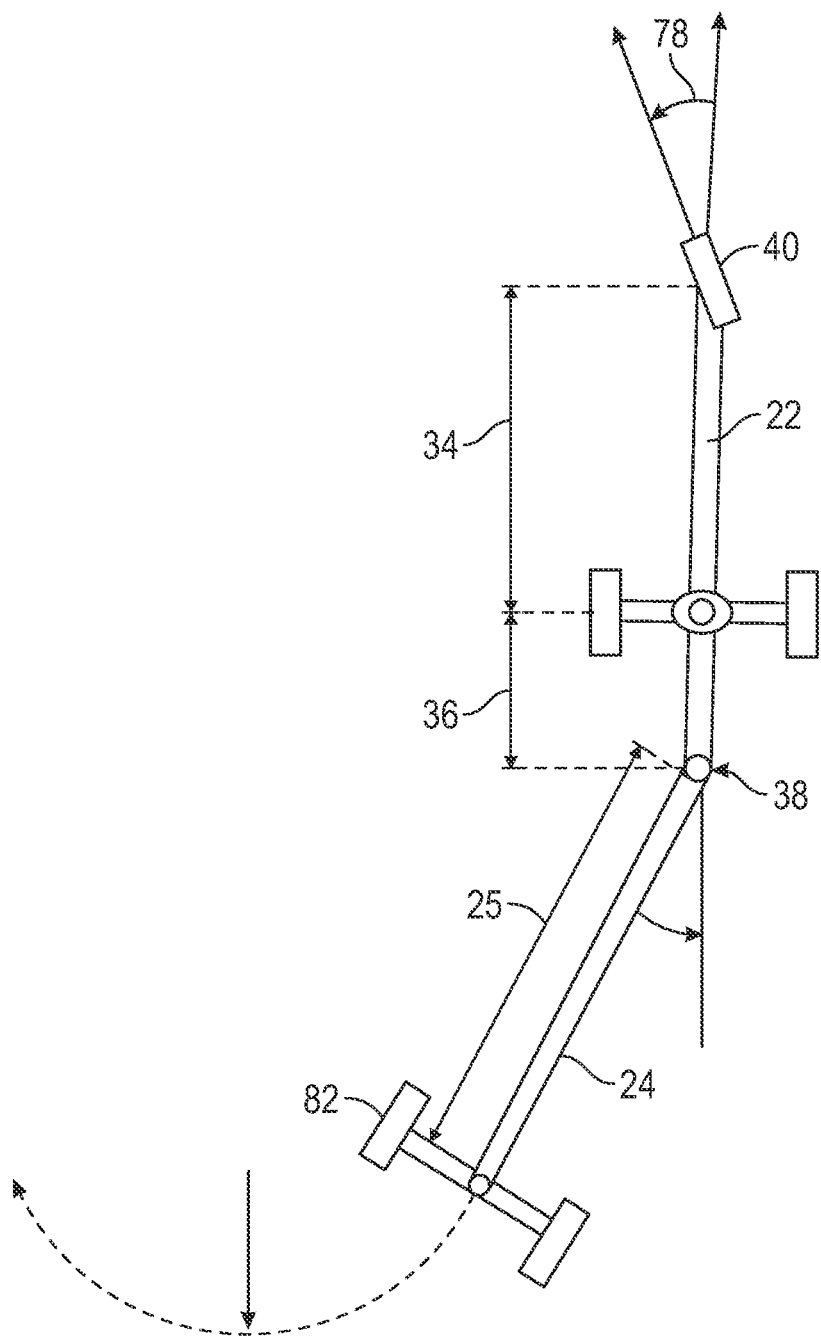
FIG. 5 is a schematic illustration of a vehicle and trailer proceeding along a corrective path.

Referring to FIG. 5, with continued reference to FIG. 2, the example vehicle 22 is shown along with the trailer 24 and includes the steering wheel 40 disposed at an angle 78. The vehicle steering system 56 utilizes the vehicle steering angle information provided by the module 70 to determine the steering angle 78 of the steering wheel 40 to move the trailer 24 back along a corrected radius of curvature 82 to move back along the predefined path 26.

Accordingly, the example vehicle control system provides for the termination of a proper curvature response that prevents overcorrection such that equilibrium may be obtained quickly without continued overcorrection response required.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of reversing a trailer along a defined path comprising:

detecting, by a controller having at least one processor, a deviation from a predefined path of a trailer coupled to a tow vehicle using sensor data from a sensor system disposed within the tow vehicle;

determining, by the at least one processor, a correction path required to move the trailer back to the predefined path;

determining, by the at least one processor, a dampening factor for limiting deviation from the predefined path;

combining, by the at least one processor, the determined correction path and the dampening factor to determine a desired curvature, wherein the desired curvature represents a path from a current position of the trailer to the predefined path;

determining, by the at least one processor, a steering angle of the tow vehicle that provides the desired curvature; and prompting, by the at least one processor, operation of a steering system of the tow vehicle to adjust the steering angle to the determined steering angle, wherein the desired curvature is determined using a first equation when the tow vehicle travels over a straight line path segment of the predefined path and a second equation when the tow vehicle travels over a curved path segment of the predefined path, wherein detecting the deviation from the predefined path includes determining a lateral deviation between a current trailer position and the predefined path, and wherein the lateral deviation is a distance between a longitudinal axis of the trailer and the predefined path that is normal to the predefined path, wherein detecting the deviation from the predefined path further includes determining a heading deviation between the current trailer position and the predefined path, and wherein the heading deviation comprises an angle defined between a longitudinal axis of the trailer and the predefined path, and wherein the predefined path comprises a plurality of waypoints disposed along the predefined path, the first equation for the desired curvature Rc is a function of a damping coefficient, a spring constant, the heading deviation and the lateral deviation, and the second equation comprises the desired curvature Rc as a function of the heading deviation, the lateral deviation, the damping coefficient, the spring coefficient, a trailer heading difference from a previous waypoint to a current waypoint, and a trailer displacement from the previous waypoint to the current waypoint.

2. The method as recited in claim 1, wherein the lateral deviation and the heading deviation are determined relative to at least one of a plurality of waypoints disposed along the predefined path.

3. The method as recited in claim 1, further comprising adjusting, by the steering system, the steering angle of the tow vehicle according to the determined steering angle.

4. The method as recited in claim 1, wherein the steering angle is determined based on a length of the wheel base and a length from a hitch to an axle of the tow vehicle.

5. The method as recited in claim 1, wherein the controller includes computer executable instructions which, when executed by the at least one processor of the controller, causes the at least one processor to perform operations for determining the desired curvature.

6. The method as recited in claim 1, further comprising determining a pose of the trailer in a local reference frame with sensors disposed in the tow vehicle.

7. The method as recited in claim 1, wherein determining the steering angle of the tow vehicle is a function of the desired curvature, the hitch angle formed between a longitudinal axis of the tow vehicle and a longitudinal axis of the trailer, a wheelbase of the trailer, a wheelbase of the tow vehicle and a length of a hitch of the trailer.

8. An autonomous vehicle control system comprising:
a controller with at least one processor and computer executable instructions configured to determine, when executed by the at least one processor, a steering angle of a tow vehicle required to maneuver an attached trailer along a predefined path, wherein the determination includes:

detecting a deviation from a predefined path of a trailer coupled to a tow vehicle using sensor data from a sensor system disposed within the tow vehicle, comprising determining a lateral deviation between a current trailer position and the predefined path, the lateral deviation comprising a distance between a longitudinal axis of the trailer and the predefined path that is normal to the predefined path, and determining a heading deviation between the current trailer position and the predefined path, the heading deviation comprising an angle defined between a longitudinal axis of the trailer and the predefined path;

determining a correction path required to move the trailer back to the predefined path;

determining a dampening factor for limiting deviation from the predefined path;

combining the determined correction path and the dampening factor to determine a desired curvature, wherein the desired curvature represents a path from a current position of the trailer to the predefined path;

determining the steering angle of the tow vehicle that provides the desired curvature; and prompting a steering system of the tow vehicle to steer the tow vehicle along the desired curvature to the predefined path based upon the determined steering angle, wherein the desired curvature Rc is a function of the heading deviation, the lateral deviation, a damping coefficient, and a spring constant.

9. The autonomous vehicle control system as recited in claim 8, wherein the controller is further configured to determine the lateral deviation and the heading deviation relative to at least one of a plurality of waypoints disposed along the predefined path.

10. The autonomous vehicle control system as recited in claim 9, wherein the controller is further configured to determine the steering angle based on a length of a wheelbase of the trailer and a length from a hitch to an axle of the tow vehicle.

11. The autonomous vehicle control system as recited in claim 8, wherein the controller further configured to determining a pose of the trailer in a local reference frame with sensors disposed in the tow vehicle.

12. The autonomous vehicle control system as recited in claim 8, wherein the desired curvature is determined using a first equation when the tow vehicle travels over a straight line path segment of the predefined path and a second equation when the tow vehicle travels over a curved path segment of the predefined path.

13. The autonomous vehicle control system as recited in claim 8, wherein the predefined path comprises a plurality of waypoints disposed along the predefined path, and the desired curvature is further a function of a heading difference of the trailer from a last waypoint to a current waypoint, and a displacement of the trailer from the last waypoint to the current waypoint.

14. The autonomous vehicle control system as recited in claim 13, wherein determining the desired curvature Rc uses the equation $$R_c = \frac{\left(\sqrt{1+\tan^2\Phi}\right)^3}{C\tan\Phi - Ky}$$

where C is the damping coefficient, K is the spring constant, Φ is the heading deviation and y is the lateral deviation.

15. The autonomous vehicle control system as recited in claim 13, wherein determining the desired curvature Rc uses the equation $$R_C = \frac{\left(\sqrt{1+\tan^2\Phi}\right)^3}{C\tan\Phi - Ky + \frac{\tan(\theta_k - \theta_{k-1})}{dist_{k-1 \to k}}}$$

where C is the damping coefficient, K is the spring constant, Φ is the heading deviation, y is the lateral deviation, $dist_{k-1 \to k}$ is the displacement of the trailer from the last waypoint to the current waypoint, and $\theta_k - \theta_{k-1}$ is the heading difference of the trailer from the last waypoint to the current waypoint.

16. The autonomous vehicle control system as recited in claim 8, further comprising the steering system which is configured to control steering of the tow vehicle along the desired curvature to the predefined path based upon the determined steering angle received.

17. A non-transitory computer readable medium comprising instructions executable by at least one controller configured to determine, when executed by at least one processor of the at least one controller, a steering angle of a tow vehicle required to maneuver an attached trailer along a predefined path, wherein the instructions include:
  instructions prompting the controller to detect a deviation from a predefined path of a trailer coupled to a tow vehicle with sensor data from a sensor system disposed within the tow vehicle, wherein detecting the deviation comprising determining a lateral deviation between a current trailer position and the predefined path, the lateral deviation comprising a distance between a longitudinal axis of the trailer and the predefined path that is normal to the predefined path, and determining a heading deviation between the current trailer position and the predefined path, the heading deviation comprising an angle defined between a longitudinal axis of the trailer and the predefined path;
  instructions prompting the controller to determine a correction path required to move the trailer back to the predefined path;
  instructions prompting the controller to determine a dampening factor for limiting deviation from the predefined path;
  instructions prompting the controller to combine the determined correction path and the dampening factor to determine a desired curvature, wherein the desired curvature represents a path from a current position of the trailer to the predefined path;
  instructions prompting the controller to determine the steering angle of the tow vehicle that provides the desired curvature; and
  instructions for prompting operation of a steering system to adjust the steering angle to the determined steering angle,
  wherein the predefined path comprises a plurality of waypoints disposed along the predefined path, and the desired curvature Rc is a function of the heading deviation, the lateral deviation, a damping coefficient, a spring constant, and a heading difference and a displacement difference of the trailer from a previous waypoint along the predefined path to a current waypoint.

18. The non-transitory computer readable medium as recited in claim 17, wherein the instructions for determining the desired curvature use a first equation when the tow vehicle travels over a straight line path segment of the predefined path and a second equation when the tow vehicle travels over a curved path segment of the predefined path, and the desired curvature Rc is a function of the heading deviation, the lateral deviation, the damping coefficient, the spring constant, and the heading difference and the displacement difference when the tow vehicle travels over the curved path segment of the predefined path.

19. The non-transitory computer readable medium as recited in claim 17, further comprising instructions for controlling steering of the tow vehicle along the desired curvature to the predefined path based upon the determined steering angle received.

* * * * *